United States Patent [19]

Gürs

[11] Patent Number: 4,635,270
[45] Date of Patent: Jan. 6, 1987

[54] LASER APPARATUS

[75] Inventor: Karl Gürs, Eschborn, Fed. Rep. of Germany

[73] Assignee: Battelle-Institut e.V., Frankfurt am Main, Fed. Rep. of Germany

[21] Appl. No.: 560,378

[22] Filed: Dec. 12, 1983

[30] Foreign Application Priority Data

Nov. 12, 1982 [DE] Fed. Rep. of Germany ....... 3245958

[51] Int. Cl.$^4$ ........................ H01S 3/22; H01S 3/223
[52] U.S. Cl. .................................................. 372/58
[58] Field of Search ........................ 372/58, 61–65; 313/231.51; 261/84; 415/182, 185, 8, 83, 144; 416/10, 92

[56] References Cited

U.S. PATENT DOCUMENTS

| | | | |
|---|---|---|---|
| 4,283,686 | 8/1981 | Daugherty et al. | 372/58 |
| 4,307,350 | 12/1981 | Farcy et al. | 372/58 |
| 4,426,705 | 1/1984 | Stevison et al. | 372/58 |
| 4,500,998 | 2/1985 | Kuwabara et al. | 372/58 |

FOREIGN PATENT DOCUMENTS 2083687  3/1982  United Kingdom .................. 372/58

OTHER PUBLICATIONS

*High Repetition Rate TEA CO$_2$ Laser*, Turgeon, IEEE J. Quantum Electronics, vol. QE-7, No. 10, Oct. 1971, pp. 495–497.

Primary Examiner—William L. Sikes
Assistant Examiner—Robert E. Wise
Attorney, Agent, or Firm—Fisher, Christen & Sabol

[57]  ABSTRACT

For a laser system with fast longitudinal gas flow, at least one impeller of the type of runners for tangential blowers with adjacent ring channel is used for the circulation of laser gas. At least two longitudinal pipes merge tangentially into the ring channel where at least one longitudinal pipe is designed as a laser resonator. The ring channel and the longitudinal pipes form a closed loop for the laser gas.

13 Claims, 8 Drawing Figures

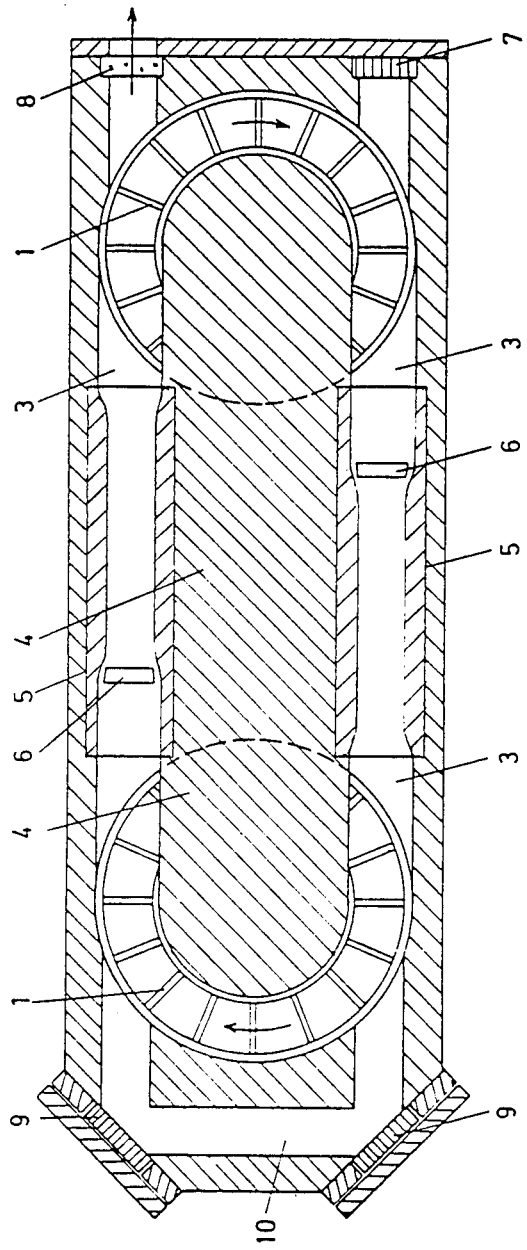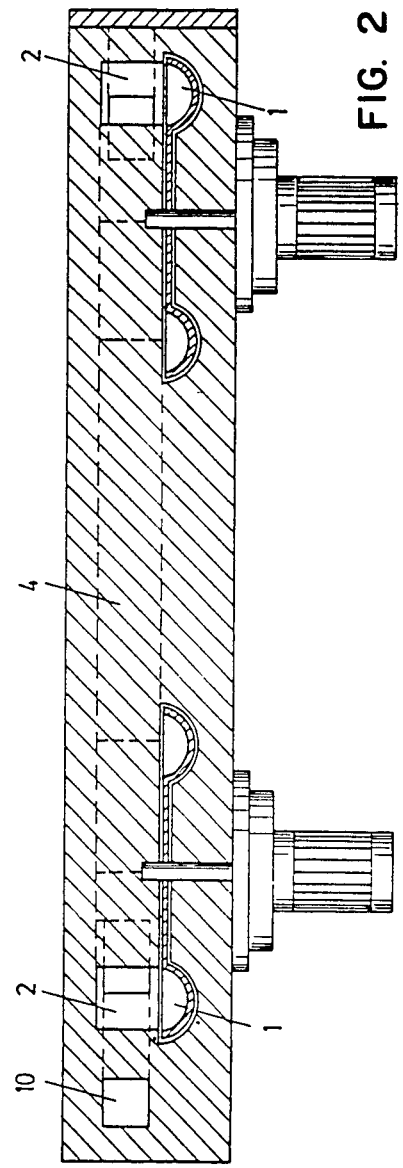

LASER APPARATUS

BACKGROUND OF THE INVENTION

1. Field Of The Invention

The invention refers to a laser apparatus in accordance with the gas transport principle with a fast longitudinal gas flow.

2. Prior Art

The efficiency, the amplification and capacity of the molecular lasers, in particular of $CO_2$ lasers, decrease with increasing temperatures in the laser gas. The reduction of the efficiency is due to the fact that with rising temperatures the line width becomes larger, the excitation energy is distributed among an increasing number of rotation levels, that the number of desactivating collisions increases and that the occupation of the laser end level increases by thermal excitation which results in a decrease of inversion. (K. Gurs, "Laser 74 Opto-Electronics", Conference Proceedings, pages 30 to 37).

Therefore, methods have already been developed which carry of the heat together with the laser gas by circulating and cooling the gas. Suitable lasers consist of an active region in which the gas is excited, with an adjacent or integrated optical resonator, of a gas transport system with a built-in cooler and a pump. Since large amounts of heat have to be carried off, large gas volumes must be circulated by pumping. Corresponding known lasers are large and expensive, and their use is limited because of their bulkiness.

This disadvantage is especially obvious in lasers with longitudinal flow where—as far as known systems are concerned—long gas lines are required. In addition, these pipes cause a correspondingly high flow resistance. Therefore, the efficiency of the system is reduced or especially large pumps will be necessary.

In systems with transversal flow, the interaction path of excited active molecules in the laser resonator is relatively small. Since the power density of lasers is not much above the saturation power, excitation energy is lost in this way, and the lasers have a comparatively low efficiency of for example less than about 10 percent. Furthermore, the transversal excitation is relatively inhomogeneous, resulting in unfavourable radiation characteristics.

The above-mentioned disadvantages of known gas transport and/or convection lasers have already been eliminated in systems where the laser chamber is designed as a cooled pipe which is arranged concentrically within one circulation turbine (German Patent Application, Publication No. 31 21 372). This actually represents an important improvement compared with known gas transport lasers with longitudinal gas flows. However, a large technical effort is required in order to realize such laser.

Especially expensive, even in a large-scale manufacture, are the following four components:

The bearing. Because of the large diameter in the event of exterior bearings and the high rotating velocity, there exists a very high velocity of movable parts against fixed parts. The problem was solved by the use of gas bearings.

The drive. Being a fast running system (400 rotations/second) with hollow inner drive assembly, the engine represents an expensive special construction.

The blading. The circulating compressor is a special construction as well. It is especially unusual and difficult to manufacture the turbine blades fixed to a rotating exterior pipe. Even the use of radial compressors does not result in any important simplification because of the complicated gas transport.

The cooling system. This component is an expensive construction unit because of the circle symmetrical configuration and the necessity of a high cooling power.

Known gas transport lasers use pumps and blowers of different types, e.g., rotary vane pumps, roots blowers (K. Gurs, "Laser 75, Opto-Electronics", Conference Proceedings, p. 30 to 37, or H. Herbrich and B. Dellith, German Patent Application, Publication No. 29 25 829), reactive current ventilators (J. D. Foster, U.S. Pat. No. 4,009,143) or radial blowers (H. J. Seduin and G. Sedgwick, Appl. Optics 11, 1972, 745–748, or K. Sasaki et al., European Patent Application 80 100 870.7, Publication No. 0 015 003). In all cases, the different components must be separately identified as partial systems with defined functions.

BROAD DESCRIPTION OF THE INVENTION

The object of the invention is to develop a laser system with a very compact configuration and a high efficiency with all functions being fully integrated so that a very short gas paths in combination with certain gas flow can be realized.

The objects and advantages of the invention are achieved by providing at least one impeller of the type of runners of tangential blowers with adjacent ring channel for the circulation of gas, by opening at least two longitudinal pipes (longitudinal channels) tangentially in the ring channel of the impeller, interrupting the ring channel between the longitudinal pipes, and be creating a circulation path for the laser gas with the ring channel and the longitudinal pipes where at least one longitudinal pipe is designed as a laser resonator.

Advantageously in the laser apparatus of the invention, two parallel longitudinal pipes tangentially connect the ring channels of two impellers. Preferably at least one longitudinal pipe is designed as a cooling section. Preferably both longitudinal pipes are designed as laser resonators, and deflecting mirrors are provided in the longitudinal pipes for the coupling of the path of rays. Also preferably the impeller has a semiannular section and radial webs. Preferably runner with blades is used as impeller. Preferably lateral ring channel systems as arranged above and below the runner with blades in which two longitudinal pipes on two levels open out. Preferably exterior ring channel systems are provided which are connected by longitudinal pipes. Further, preferably a runner with blades is extended towards the direction of the axis of rotation, and that, corresponding to broad channels, extended longitudinal pipes open out in the exterior ring channel. Preferably at least one broad channel is divided in laser pipes and deflecting mirrors are provided for the coupling of the beam paths. Preferably one broad channel is designed as the cooling section.

Advantageously, in the laser apparatus, two systems are homologously attached to each other in longitudinal direction and the rotating direction of the runners is chosen in a way that the gas flow is lead away on both sides from the laser mirrors. Preferably the drive unit with runner (unit a), the cooling section with laser pipe (unit b) and the deflection part (unit c) are joined vacuum tightly as separate modules. Preferably the cooling section with laser pipe (unit b) and/or deflection part (unit c) consist of insulating material.

BRIEF DESCRIPTION OF THE DRAWING

The invention is illustrated in detail with reference to the drawing, wherein:

FIGS. 1 to 3 show in a horizontal and a vertical section, a preferable embodiment of the apparatus wherein the ring channels are above the impellers;

DETAILED DESCRIPTION OF THE INVENTION

Figure 3:
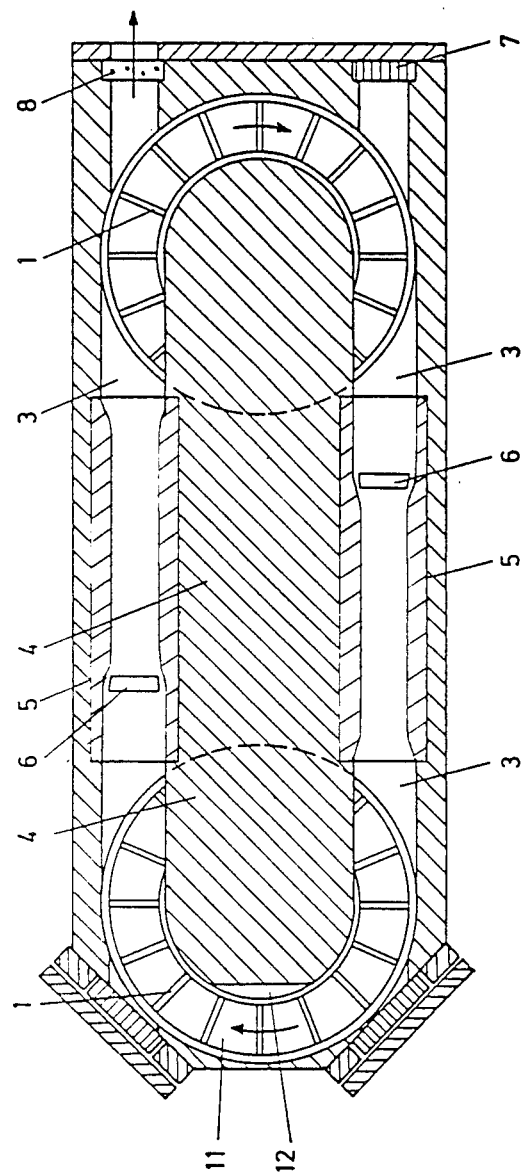

In the embodiment shown in FIGS. 1 and 2, the important parts of the system consist of two runners 1 of lateral ring channel blowers which rotate, as stated, in the direction of arrow. The laser gas is moved at the same time in ring channel 2 above the runners. Ring channel 2 opens out in two longitudinal pipes 3 which tangentially connect the two channels 2 above the runners. Metal part 4 between the runners and the longitudinal pipes serves as a skimmer at the opening of the runners, and directs the gas from ring channel 2 into longitudinal pipes 3 which at the same time serve as laser pipes. The laser gas is excited in insulated part 5 of the longitudinal pipes between the runners; the gas discharge burns between ring electrodes 6 on high tension, in the insulated pipe and the longitudinal pipe—on the earth potential—on the other side. Laser radiation runs inside the resonator from terminal mirror 7 via deflection mirror 9 to output mirror 8 and vice versa where channel 10 represents an opening for the path or rays; there, however, an important gas flow does not occur.

The whole system can be cooled by water. The cooling surface is sufficient for a laser efficiency of more than 200 W, in the event of smooth flow channels. By cutting longitudinal grooves in the ring channels and pipes, the surface and, therefore, the cooling surface, can be extended which will result in a correspondingly higher laser efficiency.

In another version shown in FIG. 3, ring channel 11 on the exterior side is provided with extension 12 on the side of the appropriate axis of rotation, and is used, at the same time, as a channel for the deflection path of rays so that additional channel 10, represented in FIGS. 1 and 2, can be deleted.

Figure 4:
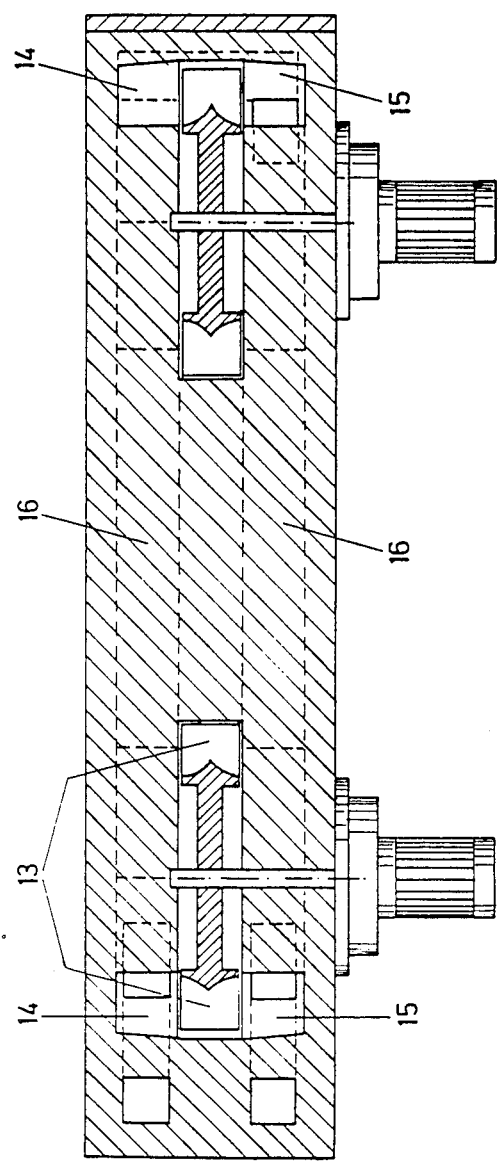
FIG. 4 shows in a vertical section, another embodiment wherein blades are provided for the gas circulation.

FIG. 4 shows another embodiment which is preferable when a high efficiency is required, wherein vanes 13 are used as runners. In this case, on both sides of runners 13, i.e., above and below, ring channel systems 14 and 15 with longitudinal pipes 16 can be arranged in accordance with FIGS. 1 to 3. The entire system will the include four laser spaces, and the ray must be deflected by means of two mirrors from one level to the other level.

Figure 5:
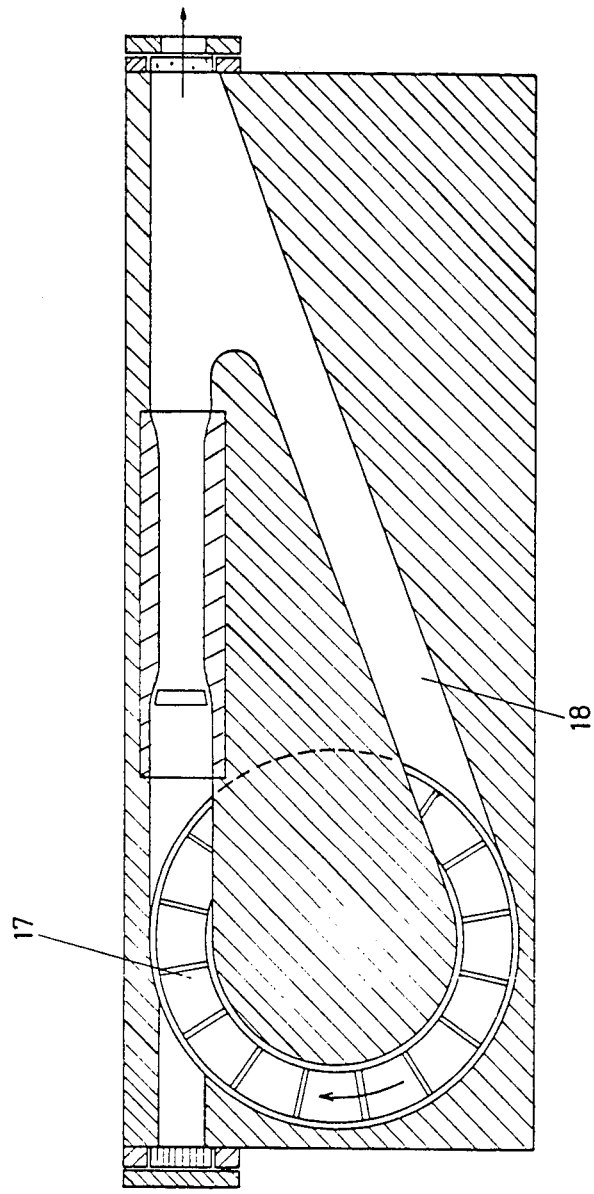
FIG. 5 shows in a horizontal section, a laser according to the invention,, with a single runner for the circulation of gas.

A particularly simple version is shown in FIG. 5. Only one runner 17 is required, and return channel 18 is used for a very efficient cooling of the laser gas.

In all embodiments, the ring channels and longitudinal pipes can be produced with a comparatively large diameter so that the flow resistance is very low. By means of runners with a diameter of 40 cm and a rotating velocity of approx. 4000 revolutions/second, nearly 1000 m$^3$ laser gas per hour can be circulated per laser pipe. In the event of a system of more than 1 kW. The efficiency can be increased in the area of multi kW, if more stable runners (e.g., made from titanium) at higher rotating velocities are used and if several systems are combined through parallel or series connection.

Figure 6:
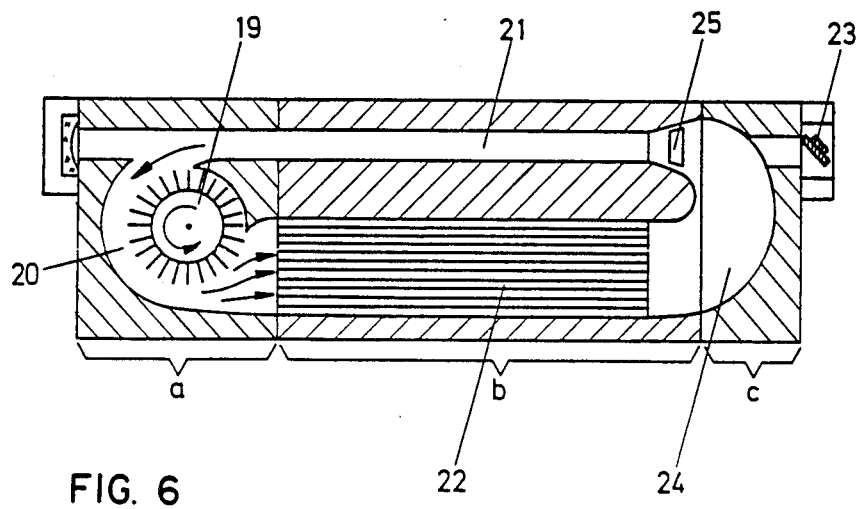
FIGS. 6 and 7 show in a horizontal and in a vertical section, another embodiment wherein a runner extended in the direction of axis of rotation is used so that the parallel attachment of several systems will be possible.
Figure 7:
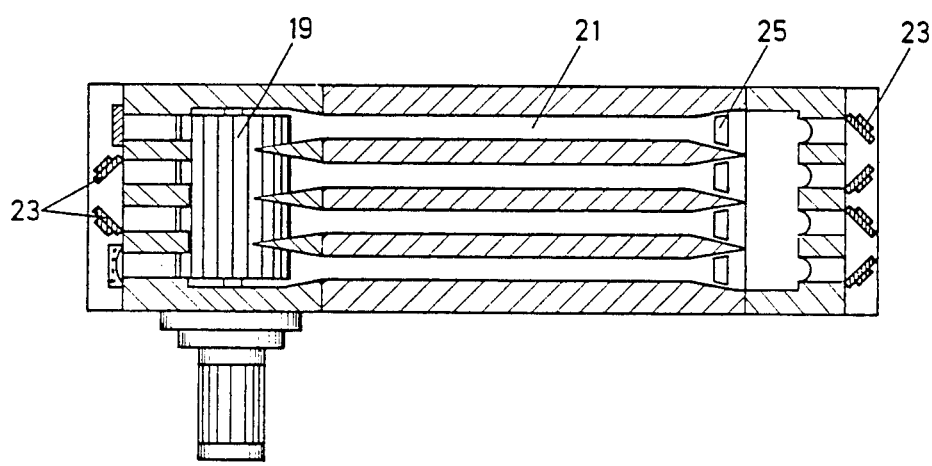

Parallel connection can be executed by for example putting several runners on one axis. Parallel connection of the system shown in FIGS. 6 and 7 is done by using extended runners 19 in the direction of the axis. In this case, exterior ring channel 20 should be used as the ring channel, and longitudinal pipes 21, 22 are extended to the broad channels. It is true that it has proven advantageous to divide longitudinal pipes 21, 22 in laser pipes again. By mirror 23, the radiation is deflected from one pipe into the next.

A preferred version uses smaller runners with a high number of revolutions of 16,000 revolution/min. or more. The laser gas is only moved on one side with runner 19, and is deflected on the other side in laser channel 21 via semi-circular channel 24. Forward move channel 22 is extended and designed as a cooler. Electrodes 25 are arranged in the beginning of the laser channel. FIG. 6 shows a section vertically through the axis of rotation of the runner, FIG. 7 shows a section through the laser channel.

Figure 8:
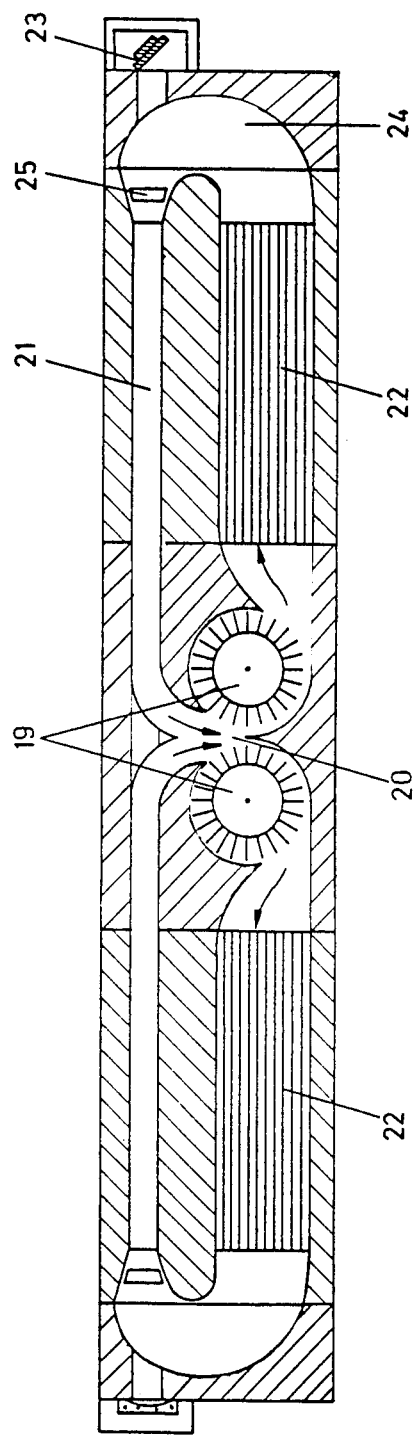
FIG. 8 shows in a horizontal section another embodiment wherein two systems in accordance with FIGS. 6 and 7 are homologously joined together.

The output power can be doubled up to the multi kW area, if two systems of this version, as shown in FIG. 8, are homologously joined together. In this event the additional advantage occurs that the flow of the laser gas on both sides is directed away of the mirrors so that contamination of the mirrors by particles in the gas flow is avoided.

It has proven advantageous as well to execute the laser, as shown in FIGS. 6 and 7, in a modul configuration, e.g. parts (a), (b) and (c). Because of production reasons it is appropriate to manufacture the drive unit with runner (part a) on one side, the terminal part with deflection channel (part c) on the other side as well as the intermediate part (part b) with cooler and laser channel separately, and to connect them vacuum tight with screws.

This makes it possible that the intermediate part (b) with cooler will be made of an insulating material, and to use the laser pipe in large length as discharge channel. It will also be possible to manufacture—instead of the intermediate part (b) with cooler—the terminal part (c) with deflection channel from an insulating material.

The problem of an insulation without a considerable reduction of the active length of the laser pipe can also be solved by using primarily ring-shaped intermediate electrodes which are divided if necessary.

What is claimed is:

1. In a gas transport laser with fast longitudinal gas flow, the gas transport apparatus comprising at least one tangential blower wheel with adjacent ring channel for the circulation of gas, the ring channel merging tangentially into at least two longitudinal channels, the ring channel extending along the circumference of the blower wheel from one longitudinal channel to the other so that the ring channel and the longitudinal channels form a closed loop for the laser gas, and where at least one longitudinal channel is equipped with end mirrors perpendicular to the tube axis which form a laser resonator.

2. Laser apparatus as claimed in claim 1 wherein the ring channels of two tangential blowers are connected by two parallel tubes arranged tangentially to the ring channels.

3. Laser apparatus as claimed in claim 1 wherein coolers are integrated into at least one longitudinal channel.

4. Laser apparatus as claimed in claim 1 wherein both longitudinal mirrors are arranged at the ends of tubes and wherein two adjacent mirrors are tilted at an angle of 45° to deflect the laser beam from one tube into the other, and wherein the other two mirrors are arranged perpendicular to the channel axis to form the laser end mirrors.

5. Laser apparatus as claimed in claim 1 wherein the blower wheel has a semi-circular cross section with integrated radial blades.

6. Laser apparatus as claimed in claim 1 wherein a runner with free blades is used as the blower wheel.

7. Laser apparatus as claimed in claim 6 wherein lateral ring channel systems are arranged above and below the runner with free blades, the ring channels merging into two longitudinal pipes.

8. Laser apparatus as claimed in claim 6 wherein the runner with free blades is extended in the direction of the axis of rotation, and that the broad exterior ring channels merge into broad longitudinal channels.

9. Laser apparatus as claimed in claim 8 wherein at least one of the longitudinal channel is broad, is divided into laser pipes, and is equipped with end mirrors which are at a 45 degree angle to the central axis of the channel for the coupling of the beam paths.

10. Laser apparatus as claimed in claim 9 wherein coolers are disposed in one broad channel.

11. Laser apparatus as claimed in claim 1 wherein two systems are homologously attached to each other in longitudinal direction, each system having a drive unit with a runner, a cooling section with a laser channel and a deflector part.

12. Laser apparatus as claimed in claim 11 wherein the drive unit with the runner, cooling section with the laser channel, and the deflection part are joined vacuum tightly as separate modules.

13. Laser apparatus as claimed in claim 12 wherein the cooling section with laser channels and deflection part consist of electrically insulating material.

* * * * *